United States Patent Office 3,532,465
Patented Oct. 6, 1970

3,532,465
PROCESS OF GRAPHITIZATION
Shen-Li Yueh, 1 Foo-Shin 2nd Lane, Foo-Shin 3rd Road,
Kaohsiung, Taiwan
No Drawing. Filed Apr. 17, 1968, Ser. No. 721,939
Int. Cl. C01b 31/04
U.S. Cl. 23—209.1    11 Claims

ABSTRACT OF THE DISCLOSURE

The present invention relates to promoting the graphitization of carbon by incorporating therewith gleditschia sinensis pods, gleditschiasaponin or a product of partial combustion of either of them, introducing oxygen and heating said carbon to a temperature such as 900° to 1200° C. or higher while protecting against uncontrolled oxygen.

DESCRIPTION OF THE INVENTION

The present invention relates to a process of promoting the graphitization of carbon.

It will be evident that when oxygen is referred to herein, it is intended to include oxygen as such and also air which is used as a source of oxygen.

A purpose of the invention is to promote the graphitization of carbon to form graphite completely or partially at lower temperatures than have been heretofore useable.

A further purpose is to promote graphitization by Gleditschia sinensis pods, gleditschiasaponin, or a product of partial combustion of either of them in the presence of oxygen, which may be free oxygen as in air or oxygen combined in the combustion product formed.

A further purpose is to render the Gleditschia sinensis pods or gleditschiasaponin available to promote graphitization by forming a gaseous product therefrom and allowing the carbon to be graphitized to adsorb this gaseous product. The gaseous product can be obtained by partial combustion or by thermal decomposition and adding oxygen.

A further purpose is to conduct the heating in a closed chamber containing oxygen, or in a chamber into which a stream of oxygen, for example, air, is passed until there is enough.

A further purpose is to bond the carbon and the Gleditschia sinensis pods, gleditschiasaponin or a product of decomposition thereof with a binder so as to form a shape prior to heating, or to heat the mixture as a paste by charging into a Soderberg electrode casing in a metallurgical furnace. The heating of the shape can be carried out in a furnace especially for this purpose, or the shape can be an electrode which is heated during use, for example, in a metallurgical furnace.

Further purposes appear in the specification and in the claims.

In the prior art the conversion of amorphous carbon into graphite is expensive chiefly for two reasons:

(1) Very long times are required, usually of the order of 80 days, when using metallic sodium as a catalyst at 950° C. during alumina electrolysis. Under ordinary conditions graphitization will not take place in any foreseeable time at this lower temperature.

(2) Elevated temperatures are normally employed. For example, the Acheson process uses a temperature of the order of 2500° C. Also, metal oxides are used as catalysts for graphitizing, so that the artificial graphite contains some impurities.

I have discovered that graphite can be produced very much less expensively by employing an organic graphitizer which is derived from Gleditschia sinensis pods.

Gleditschia sinensis is a species of thorny tree, the name of the genus sometimes being spelled "gleditsia." Gleditschia sinensis pods are available as a regular article of commerce utilized primarily as a soapy material in solution.

An extract of gleditschia sinensis pods known as gleditschiasaponin is equally effective for the purposes of the present invention. It is obtained by extracting Gleditschia sinensis pods in boiling water (distilled water is ordinarily used to avoid impurities) and then filtering, rejecting the deposit on the filter, and concentrating the filtrate either by evaporating it to dryness, in which case it is used as a solid powder, or by evaporating it to form a concentrated solution. It will be understood when gleditschiasaponin is referred to that it will be necessary to eliminate the water either before employing it or prior to final heating of the carbon.

The carbon which is to be used in accordance with the invention may be one of a wide variety of amorphous carbon materials, such as carbon black, coke, coal, especially anthracite coal or petroleum coke, or other carbonaceous material or product.

It will be understood that in some cases complete graphitization is not desired and the invention is applicable whether the graphite product is to be entirely graphite or only partially graphitized.

In carrying out the process of the invention, it is important that the Gleditschia sinensis pods, gleditschiasaponin, or a gaseous product of burning thereof be incorporated with the carbon. This incorporation may involve adsorption of the organic graphitizer on the carbon in which case the organic graphitizer must be converted into a reactive gas (smoke), or it may be mixing or blending.

There are two convenient ways to convert pods of Gleditschia sinensis or gleditschiasaponin into a reactive gas. One of these methods is to partially burn the organic graphitizer under a limited supply of oxygen or air so as to produce a reactive gas. Air or oxygen may oxidize the decomposition product of organic graphitizer.

I find that in using partial combustion to make the reactive gas enough air should be employed so that one gram of gleditschia sinensis pods can produce about 500 to 2000 ml. of reactive gas. (Measured at standard conditions of temperature and pressure.)

An alternate procedure for obtaining a reactive gas from Gleditschia sinensis pods or gleditschiasaponin is to thermally decompose the organic graphitizer by destructive distillation, preferably at a temperature of about 500 to 800° C., and then incorporate air with the gas so as to oxidize the gaseous decomposition product. Once again it is satisfactory if one gram of Gleditschia sinensis pods produces about 500 to 2000 ml. of reactive gas (standard conditions) after introduction of air. If physical mixing of the organic graphitizer and the carbon is to be used, one technique is to cool the reactive gas obtained by partially burning pods of Gleditschia sinensis or gleditschiasaponin, or by destructive thermal distillation so as to obtain a solid deposit which can be blended with powdered carbon, then pulverized, and mixed with a carbon, or can be dissolved in a solvent such as hot water and the solution thoroughly mixed with the carbon, moisture being eliminated prior to heating.

Another technique for physically mixing the organic graphitizer is to pulverize the pods of Gleditschia sinensis or gleditschiasaponin and mix them with the carbon and preferably with a binder such as tar or pitch, and then mold the mixture into briquettes in a briquetting press or into furnace electrodes in an extrusion press prior to heating, or heat the mixture as paste by charging into Soderberg electrode casings for continuous self-baking during use in an arc or aluminum electrolytic furnace.

Better results are obtained by adsorbing the reactive gas on the carbon than by mixing the organic graphitizer with the carbon. Therefore, it is preferred to first adsorb the reactive gas on the carbon and then to mix the thus-treated carbon with a pitch or tar binder and then mold into a shape such as a briquette or an electrode, or charge as a paste into a Soderberg electrode casing.

The actual heating for graphitizing can be carried out in several different ways. If the organic graphitizer is to be adsorbed on the carbon, it is best to bring the hot reactive gas directly from the partial burning of the gleditschiasaponin or the *Gleditschia sinensis* pods or directly from the thermal decomposition, with the addition of air, into contact with the carbon, which can be contained in the same retort or not. The carbon is preferably exposed to the reactive gas so as to adsorb gas sufficiently. The carbon thus treated with the organic graphitizer can then be graphitized by heating it without briquetting in a suitable heating chamber at a temperature of 900° C. or higher for the required time. As will be explained, graphitization begins to take place after about four to six hours heating at 950° C., but if the carbon graphitizes more slowly, longer times may be used. Temperatures as high as 1200° C. or higher may be used to obtain more rapid graphitization.

Where admixture of the carbon and the *Gleditschia sinensis* pods or gleditschiasaponin or their products of partial combustion or destructive distillation is used, the mixture can simply be heated in an uncompacted form at a temperature of 950° C. or higher, preferably enclosing it in a reaction chamber in which a slight subatmospheric pressure can be maintained on the reactive gas and air.

For many purposes, however, the best procedure is to form carbon which has adsorbed the reactive gas into a shape with a binder such as pitch or tar and then heat the shape in a suitable chamber, for example, an airtight muffle or reaction chamber at a temperature of 900° C. or higher. After about four to six hours heating at 1200° C., graphitization will be substantial. Longer heating time will produce complete graphitization.

If an actual metallurgical furnace or the like is to be used to supply the heat for graphitizing, it is best to mix carbon which has adsorbed the reactive gas or the organic graphitizer on it, with a binder such as pitch or tar, heating the mixture as a paste used to charge a Soderberg electrode casing in an arc or aluminum electrolytic furnace for self-baking, or forming the mixture in an extrusion press into an electrode for pre-baking.

If the mere admixture of the organic graphitizer and carbon is to be used, it is still preferable to form the mixture of carbon and organic graphitizer into a shape such as a briquette or an electrode and heat it to a temperature of 900° C. or higher. If gleditschiasaponin or *Gleditschia sinensis* pods themselves are used, oxygen should be available in the retort or chamber or in the electric furnace to aid in conversion.

The time of graphitization of carbon at a temperature higher than 900° C. is inversely proportional to the temperature used, higher temperatures requiring shorter times. The temperature in the foregoing cases will preferably be at 1200° C.

I find that very good results are obtained if 2000 ml. of reactive gas from about 1 gram of *Gleditschia sinensis* pods or its content of gleditschiasaponin is adsorbed on about 200 to 400 grams of carbon such as coke or anthracite.

While benefit can be obtained from lesser quantities, for example, as little as ½ kg. under close control, and larger quantities can be used without impairing the process, I find that about 2 to 10 kg. of *Gleditschia sinensis* pods are sufficient as a catalyst to promote the conversion of one ton of 1000 kg. of carbon such as coke to graphite.

EXAMPLE 1

A charge of 2 to 10 kg. of *Gleditschia sinensis* pods was placed in a retort or an air-tight chamber and the retort was heated to 500 to 800° C. and a sufficient volume of air was introduced to produce 500 to 2000 ml. of reactive gas for every 200 grams of coke, the operation being continued partially burning the *Gleditschia sinensis* pods until they were completely carbonized. The reactive gas or smoke thus produced was introduced into a retort containing the petroleum coke and the coke was allowed to adsorb the gas homogeneously at room temperature.

The coke was then removed to a closed muffle furnace and heated at 950° C. for four to six hours. The furnace was then cooled down and samples were removed and subjected to X-ray diffraction studies under the following conditions:

Radiation was nitrogen-filtered CUK.
The camera was a Debye-Scherrer 57.3 mm.
The peak voltage was 39 kv.
The tube current 19 milliamperes.
Time of exposure was 40 minutes.

The X-ray diffraction photographs as compared to the controls show that graphitization has begun to take place.

EXAMPLE 2

The procedure of Example 1 was carried out except that the final heating was carried on for two and one half hours at 950° C. and one hour at 1200° C. The X-ray diffraction photograph shows that a considerable amount of conversion of the carbon into crystalline graphite has taken place.

EXAMPLE 3

The procedure of Example 1 was carried out except that the final heating was carried out for three hours at 1200° C. The X-ray diffraction photographs show still further conversion into crystalline graphite.

EXAMPLE 4

The procedure of Example 1 was carried out except that the coke prior to the final heating was briquetted with 30% pitch. In the final heating the briquettes were heated for six hours at 950° C. The X-ray diffraction photographs show light halos of crystalline graphite, in contrast to the control. It should be remembered that pitch coke is very difficult to convert into graphite.

EXAMPLE 5

The procedure of Example 1 was carried out except that the reactive gas was made by thermal decomposition of the *Gleditschia sinensis* pods in the retort at about 500 to 800° C. and then air was introduced to make up a volume of reactive gas equivalent to approximately 500 to 2000 ml. per gram of *Gleditschia sinensis* pods or its content of gleditschiasaponin at standard conditions. The destructive distillation was carried on until carbonization of the organic graphitizer took place. Good results are obtained but the results from partial burning of the organic graphitizer are somewhat better.

EXAMPLE 6

The procedure of Example 1 was carried out except that instead of *Gleditschia sinensis* pods its content of gleditschiasaponin is used. The results are comparable.

EXAMPLE 7

Anthracite coal is mixed with one gram of *Gleditschia sinensis* pods per 300 to 400 grams of coal. The mixture is heated in a closed retort or chamber having a volume of 500 to 2000 ml. per 300 to 400 grams of anthracite coal, the retort being initially filled with air. The heating is continued at 1200° C. for four to six hours. A substantial amount of graphitization is obtained.

EXAMPLE 8

A mixture of anthracite coal, petroleum coke and *Gleditschia sinensis* pods in the proportion of one gram of *Gleditschia sinensis* pods to 200 to 300 grams of anthracite coal and petroleum coke was mixed with 10 to 20% by weight of pitch on the weight of the carbon and formed into briquettes and heated for four to six hours at 1200° C. in a closed chamber having a volume of the order of 500 ml. per gram of pods. A substantial amount of graphitization takes place.

In view of my invention and disclosure, variations and modifications to meet individual whim or particular need will doubtless become evident to others skilled in the art to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. A process of promoting the graphitization of carbon which comprises incorporating with the carbon a product of the class consisting of *Gleditschia sinensis* pods, gleditschiasaponin, and products of partial combustion thereof, and heating said carbon to a temperature of at least 900° C. while protecting against uncontrolled air to cause graphitization thereof.

2. A process of claim 1, in which the heating is conducted to a temperature of at least 950° C.

3. A process of claim 1 in which the heating is conducted to a temperature of at least 1200° C.

4. A process of claim 1 in which said product is incorporated with the carbon by partially burning the *Gleditschia sinensis* pods or gleditschiasaponin to produce a reactive gas, and exposing the carbon to the reactive gas until the reactive gas is adsorbed on the carbon.

5. A process of claim 4 in which the carbon is mixed with a binder and the mixture is molded into a shape before heating.

6. A process of claim 4 in which the carbon is mixed with a binder and the mixture is heated as a paste in a Soderberg electrode casing.

7. A process of claim 1 in which said product is incorporated with the carbon by thermally decomposing the *Gleditschia sinensis* pods or gleditschiasaponin to form a reactive gas, adding oxygen, and exposing the carbon to the reactive gas and oxygen until they are adsorbed on the carbon.

8. A process of claim 7 in which the carbon is mixed with a binder and the mixture is molded into a shape before heating.

9. A process of claim 1 in which said product is incorporated with the carbon by mixing the carbon with the *Gleditschia sinensis* pods or gleditschiasaponin and oxygen is introduced before heating.

10. A process of claim 9 in which the heating is conducted in a closed chamber.

11. A process of claim 9 in which the heating is conducted in a chamber and a stream of oxygen-containing gas is passed into the chamber.

References Cited

UNITED STATES PATENTS

| 2,780,527 | 2/1957 | Marisic et al. | 23—209.1 |
| 2,949,344 | 8/1960 | Macura | 23—209.1 |
| 3,013,864 | 12/1961 | Carr | 23—209.1 |

OTHER REFERENCES

Mantell "Industrial Carbon" 2nd ed. Copyright 1946 by D. Van Nostrand Co. Inc. pps. 207–216.

EDWARD J. MEROS, Primary Examiner

U.S. Cl. X.R.

23—209.5; 264—29